United States Patent
Kassa et al.

(10) Patent No.: US 8,475,694 B2
(45) Date of Patent: Jul. 2, 2013

(54) SHAPED EXPANDABLE MATERIAL

(75) Inventors: Abraham Kassa, Shelby Township, MI (US); David Kosal, Richmond, MI (US); Kevin Hicks, Harrison Township, MI (US)

(73) Assignee: Zephyros, Inc., Romeo, MI (US)

( * ) Notice: Subject to any disclaimer, the term of this patent is extended or adjusted under 35 U.S.C. 154(b) by 1734 days.

(21) Appl. No.: 11/551,035

(22) Filed: Oct. 19, 2006

(65) Prior Publication Data

US 2007/0090560 A1    Apr. 26, 2007

Related U.S. Application Data

(60) Provisional application No. 60/729,820, filed on Oct. 25, 2005.

(51) Int. Cl.
*B29C 44/00* (2006.01)
*B29C 44/12* (2006.01)
*B29C 44/44* (2006.01)

(52) U.S. Cl.
USPC .................. 264/54; 264/328.1; 264/259

(58) Field of Classification Search
USPC ........................................ 264/230
See application file for complete search history.

(56) References Cited

U.S. PATENT DOCUMENTS

| | | | |
|---|---|---|---|
| 4,610,836 A | 9/1986 | Wycech | |
| 4,751,249 A | 6/1988 | Wycech | |
| 4,769,391 A | 9/1988 | Wycech | |
| 4,923,902 A | 5/1990 | Wycech | |
| 5,040,803 A | 8/1991 | Cieslik et al. | |
| 5,160,465 A | 11/1992 | Soderberg | |
| 5,182,163 A * | 1/1993 | Wheat et al. | 442/203 |
| 5,274,006 A | 12/1993 | Kagoshima et al. | |
| 5,708,042 A * | 1/1998 | Hasegawa | 521/94 |
| 5,804,608 A | 9/1998 | Nakazato et al. | |
| 5,806,919 A | 9/1998 | Davies | |
| 5,931,474 A | 8/1999 | Chang et al. | |
| 5,992,923 A | 11/1999 | Wycech | |
| 5,994,422 A | 11/1999 | Born et al. | |
| 6,040,350 A | 3/2000 | Fukui | |
| 6,103,784 A | 8/2000 | Hilborn et al. | |
| 6,135,542 A | 10/2000 | Emmelmann et al. | |
| 6,199,940 B1 | 3/2001 | Hopton et al. | |
| 6,233,826 B1 | 5/2001 | Wycech | |
| 6,321,793 B1 | 11/2001 | Czaplicki et al. | |
| 6,357,819 B1 | 3/2002 | Yoshino | |

(Continued)

FOREIGN PATENT DOCUMENTS

DE    196 48 164 A1    5/1998
DE    198 58 903 A1    12/1998

(Continued)

OTHER PUBLICATIONS

Machine Translation of JP 11-106544, Amano et al., Apr. 20, 1999.*

(Continued)

*Primary Examiner* — Monica Huson
(74) *Attorney, Agent, or Firm* — The Dobrusin Law Firm, PC

(57) ABSTRACT

An expandable material is shaped to form a part that can provide functional attributes such as reinforcement to a structure of article of manufacture such as an automotive vehicle.

20 Claims, 4 Drawing Sheets

U.S. PATENT DOCUMENTS

| | | | |
|---|---|---|---|
| 6,376,564 B1 | 4/2002 | Harrison | |
| 6,378,933 B1 | 4/2002 | Schoen et al. | |
| 6,467,834 B1 | 10/2002 | Barz et al. | |
| 6,479,560 B2 | 11/2002 | Freitag et al. | |
| 6,482,486 B1 | 11/2002 | Czaplicki et al. | |
| 6,523,857 B1 | 2/2003 | Hopton et al. | |
| 6,548,593 B2 | 4/2003 | Merz et al. | |
| 6,573,309 B1 | 6/2003 | Reitenbach et al. | |
| 6,619,727 B1 | 9/2003 | Barz et al. | |
| 6,641,208 B2 | 11/2003 | Czaplicki et al. | |
| 6,733,040 B1 | 5/2004 | Simboli | |
| 6,776,869 B1 | 8/2004 | Schenkel | |
| 6,787,579 B2 | 9/2004 | Czaplicki et al. | |
| 6,846,559 B2 | 1/2005 | Czaplicki et al. | |
| 6,928,736 B2 | 8/2005 | Czaplicki et al. | |
| 7,141,194 B1 | 11/2006 | Beckmann | |
| 7,141,206 B2 | 11/2006 | Ishikawa et al. | |
| 2002/0066254 A1 | 6/2002 | Ebbinghaus | |
| 2002/0074827 A1 | 6/2002 | Fitzgerald et al. | |
| 2003/0209921 A1 | 11/2003 | Coon et al. | |
| 2004/0074150 A1 | 4/2004 | Wycech | |
| 2004/0131839 A1 | 7/2004 | Eagle | |
| 2004/0131840 A1 | 7/2004 | Ferguson et al. | |
| 2004/0181013 A1 | 9/2004 | Schenkel | |
| 2004/0262853 A1 | 12/2004 | Larsen et al. | |
| 2004/0266898 A1 | 12/2004 | Kassa et al. | |
| 2005/0048276 A1 | 3/2005 | Wilson | |
| 2005/0081383 A1 | 4/2005 | Kosal et al. | |
| 2005/0119372 A1 | 6/2005 | Czaplicki et al. | |
| 2005/0172486 A1 | 8/2005 | Carlson et al. | |
| 2005/0249916 A1 | 11/2005 | Muto et al. | |
| 2005/0268454 A1 | 12/2005 | White | |

FOREIGN PATENT DOCUMENTS

| | | |
|---|---|---|
| EP | 0 383 498 B1 | 3/1993 |
| EP | 0 710 696 A2 | 5/1996 |
| EP | 0 893 332 A1 | 1/1999 |
| EP | 1 006 022 A2 | 6/2000 |
| EP | 0 893 332 B1 | 3/2002 |
| EP | 1 256 512 A2 | 11/2002 |
| EP | 1 006 022 B1 | 9/2003 |
| EP | 1 134 314 B1 | 9/2004 |
| EP | 1 155 082 B1 | 9/2004 |
| EP | 1 666 228 A2 | 6/2006 |
| FR | 2115177 | 7/1972 |
| JP | 57-117542 | 7/1982 |
| JP | 58-87668 | 6/1983 |
| JP | 01 069 308 | 3/1989 |
| JP | 7-31569 | 7/1995 |
| JP | 11 106544 | 4/1999 |
| JP | 2001-88739 | 4/2001 |
| JP | 2002-120250 | 4/2002 |
| JP | 2003-226261 | 8/2003 |
| WO | WO97/02967 | 1/1997 |
| WO | WO96/22324 | 5/1997 |
| WO | WO98/36944 | 8/1998 |
| WO | WO99/02578 | 1/1999 |
| WO | WO99/48746 | 9/1999 |
| WO | WO00/12595 | 3/2000 |
| WO | WO 00/13958 | 3/2000 |
| WO | WO00/20483 | 4/2000 |
| WO | WO00/37242 | 6/2000 |
| WO | WO00/37302 | 6/2000 |
| WO | WO00/37554 | 6/2000 |
| WO | WO00/52086 | 9/2000 |
| WO | WO01199667 | 3/2001 |
| WO | WO01/54936 | 8/2001 |
| WO | WO02/055923 | 7/2002 |
| WO | WO02/088214 | 11/2002 |
| WO | WO03/059997 | 7/2003 |
| WO | WO03/061934 | 7/2003 |
| WO | WO03/078163 | 9/2003 |
| WO | WO03/093387 A1 | 11/2003 |
| WO | WO2004/060984 | 7/2004 |
| WO | WO2004/062869 | 7/2004 |
| WO | WO2004/065485 | 8/2004 |
| WO | WO2005/077634 A2 | 8/2005 |
| WO | WO2005/090431 | 9/2005 |
| WO | WO2006/131190 | 12/2006 |

OTHER PUBLICATIONS

Copending U.S. Appl. No. 10/718,509, filed Nov. 20, 2003.
Copending Patent Application Serial No. GB 0220945.0 filed Sep. 10, 2002.
Copending Patent Application Serial No. EP 0300159.1 filed Jan. 6, 2003.
Copending U.S. Appl. No. 11/188,679, filed Jul. 25, 2005.
Copending U.S. Appl. No. 11/189,190, filed Jul. 26, 2005.
Copending U.S. Appl. No. 11/254,129, filed Oct. 19, 2005.
Copending U.S. Appl. No. 60/753,973, filed Dec. 23, 2005.
Copending U.S. Appl. No. 11/339,431, filed Jan. 25, 2006.
Copending U.S. Appl. No. 11/390,658, filed Mar. 28, 2006.
Copending U.S. Appl. No. 11/391,884, filed Mar. 29, 2006.
Copending U.S. Appl. No. 11/339,535, filed Mar. 30, 2006.
Copending U.S. Appl. No. 11/393,431, filed Mar. 30, 2006.
Copending U.S. Appl. No. 11/401,207, filed Apr. 10, 2006.
Copending U.S. Appl. No. 11/381,769, filed May 5, 2006.
Copending U.S. Appl. No. 60/746,810, filed May 9, 2006.
Copending U.S. Appl. No. 60/747,677, filed May 19, 2006.
Copending U.S. Appl. No. 60/804,117, filed Jun. 7, 2006.
Copending U.S. Appl. No. 11/422,705, filed Jun. 7, 2006.
Copending U.S. Appl. No. 60/820,295, filed Jul. 25, 2006.
Copending U.S. Appl. No. 10/597,610, filed Aug. 1, 2006.
Copending U.S. Appl. No. 11/461,557, filed Aug. 1, 2006.
Copending U.S. Appl. No. 11/463,662, filed Aug. 10, 2006.
Klein et al., Application of Structural Foam in the Body in White.
Copending U.S. Appl. No. 11/467,185, filed Aug. 25, 2006.
Copending U.S. Appl. No. 60/824,991, filed Sep. 8, 2006.
Copending U.S. Appl. No. 11/531,067, filed Sep. 12, 2006.
Copending U.S. Appl. No. 60/828,704, filed Oct. 9, 2006.
Copending U.S. Appl. No. 11/549,781, filed Oct. 16, 2006.
Zalobsky et al., "Recommendations on Selection and Use of Cavity Reinforcement Materials" Proceedings of the 1999 Noise and Vibration Conference.
Liu et al., "Validation of Epoxy Foam for Structural and Crash Application". 2004 SAE World Congress, Mar. 8-11, 2004.
Casey et al., "Expandable Epoxy Foam: A Systematic Approach to Improve Vehicle Performance", 2004 SAE World Congress, Mar. 8-11, 2004.
International Search Report dated Mar. 12, 2007. PCT/US06/041574.
Database WPI Week 198528 Derwent Publications Ltd., London, GB, AN 1985-167916, XP002422534 & JP 60 096681 A, Nitto Electric Ind Co. Abstract.
Database WPI Week 198717 Derwent Publications Ltd., London, GB; AN 1987-119231, XP002422535 & JP 62 062882 A, Iida Sangyo KK. Abstract.
Database WPI Week 199806 Derwent Publications Ltd., London, GB; AN 1998-056303, XP002422536 & JP09176616 A, Nitto Denko Corp. Abstract.

* cited by examiner

SHAPED EXPANDABLE MATERIAL

CLAIM OF PRIORITY

This application claims the benefit of the filing date of U.S. Provisional Application No. 60/729,820 filed Oct. 25, 2005.

FIELD OF THE INVENTION

The present invention relates to a shaped expandable material suitable for application to an article of manufacture. More particularly, the present invention relates to a foamable material that is shaped for application to a cavity or other location of a transportation vehicle such as an automotive vehicle for providing sealing, baffling, reinforcement, sound dampening, sound attenuation, combinations thereof or the like to the vehicle.

BACKGROUND OF THE INVENTION

For many years industry, and particularly the transportation industry has been concerned with providing functional attributes sealing, baffling, acoustic attenuation, sound dampening and reinforcement to articles of manufacture such as automotive vehicles. In turn, industry has developed a wide variety of materials and parts for providing such functional attributes. In the interest of continuing such innovation, the present invention seeks to provide an improved material and/or improved part for providing such functional attributes. The material and/or part can provide sealing, baffling, acoustic attenuation, sound dampening, combinations thereof or the like, but the part and/or material have been found to be particularly adept at providing reinforcement.

SUMMARY OF THE INVENTION

A part is formed of an expandable material and the part is configured for providing reinforcement, baffling, sealing or a combination thereof to a structure of an article of manufacture. The part is formed by providing an expandable material that exhibits a self supporting characteristic. The self supporting characteristic is provide through one or more of partial curing of the expandable material, fast cure time of the expandable material and/or inclusion of relatively high molecular weight polymeric material, toughened thermoplastic and/or thixotropic or fibrous filler within the expandable material. The part can be shaped by molding, extrusion or other techniques. Thereafter, the part is typically inserted into a cavity that is at least partially defined by a structure of the article of manufacture. After insertion, the expandable material is typically activated to cure, expand and adhere to walls of the structure.

DETAILED DESCRIPTION

Figure 1:
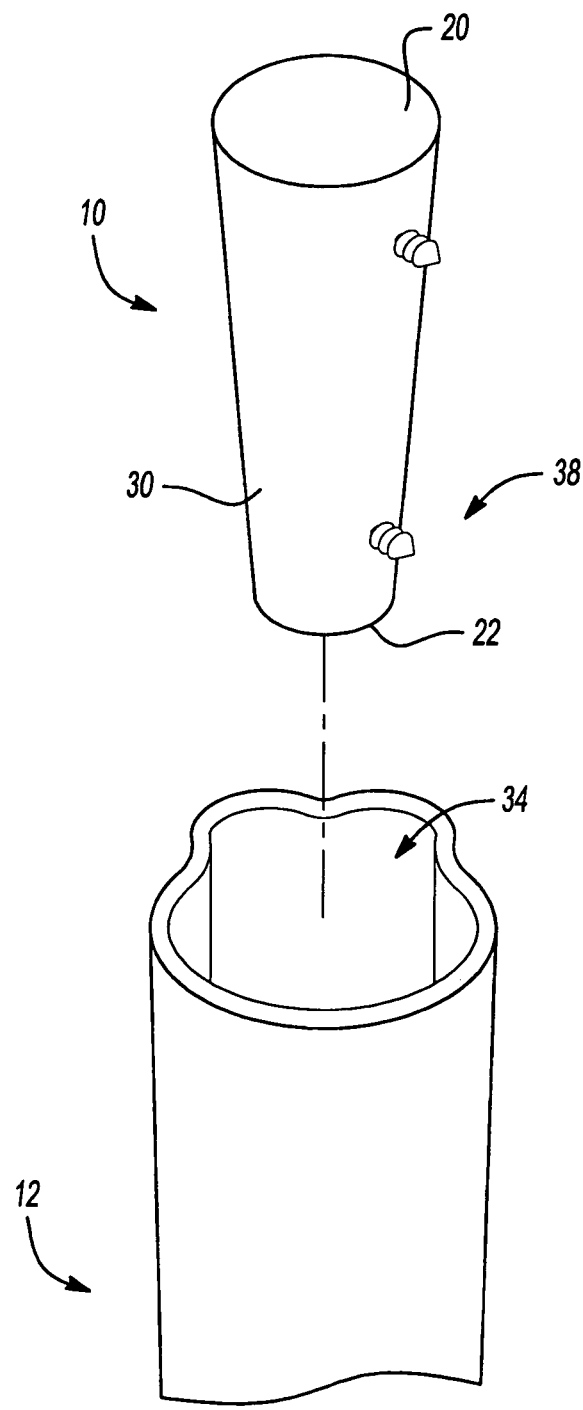
FIG. 1 is a perspective view of a shaped part formed of expandable material in accordance with an aspect of the present invention.

The present invention is predicated upon the provision of a shaped expandable material, a method of forming and/or using the shaped materials and articles incorporating the same. The expandable material can be employed to form parts for providing functional attributes such as sealing, baffling, dampening, altervation, reinforcement or a combination thereof to structures of articles of manufacture such as buildings, appliances, or the like. The parts of expandable material are particularly adept at providing such functional attributes to transportation vehicles (e.g., boats, trains, automotive vehicles).

Formation of the shaped expandable material typically includes one or any combination of the following:
1) mixing components to form an expandable material, the components including one or more polymeric materials, one or more curing agents and one or more blowing agents;
2) shaping the expandable material to form a shaped expandable part suitable for application to a structure of an article of manufacture;
3) placement of the shaped expandable part adjacent (e.g., within a cavity of) a structure of an article of manufacture; and
4) activation of the shaped expandable part such that the part expands (e.g., foams), adheres to walls of the structure and cures (e.g., thermosets).

Advantageously, the components and processing of the expandable material of the present invention can provide a part that is substantially entirely homogeneously formed of the expandable material wherein the part is sufficiently self supporting such that, upon activation of the expandable material, the part will expand to increase the volume occupied by the part without the part significantly losing its shape. Alternatively, however, it is contemplated that the components and process may be employed to form a part that does have more significant shape change.

The expandable material may include multiple different components or ingredients such as polymeric materials, curing agents, curing agent accelerators, blowing agents, blowing agent accelerators, fillers, thickeners, surfactants adhesion promoters, combinations thereof or the like. Typically, the expandable material will be formulated to include ingredients or according to techniques that assist in providing the expandable material with self supporting characteristics during activation of the expandable material. As one example, the expandable material will include one or more relatively high molecular weight polymeric materials for providing self support. As another example, the expandable material can include fillers (e.g., fibers) that assist in imparting self supporting characteristics to the expandable material. As still another example, the expandable material can include a first curing agent that at least partially cures the expandable material prior to activation of the expandable material (e.g., during forming, processing and/or shaping of the expandable material) for providing the self supporting characteristics. It is also contemplated that faster and/or lower temperature curing agents and/or curing agent accelerators and/or faster or lower temperature blowing agents and/or blowing agent accelerators may be employed to minimize foaming and curing times such that activation of the expandable material is accomplished while the expandable material remains self supported.

Of course, these materials or techniques can be employed in combination to form particularly desirable expandable materials and particularly desirable expandable parts.

Polymeric Materials

It is contemplated within the present invention that various polymers may be included in the expandable material, e.g., by copolymerization, by blending, or otherwise. For example, without limitation, other polymers that might be appropriately incorporated into the expandable material include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., ethylene vinyl acetate (EVA)), methacrylates (e.g., ethylene methyl acrylate polymer (EMA)) or mixtures thereof. Other potential polymeric materials may be or may include include, without limitation, polyethylene, polypropylene, polystyrene, polyolefin, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

Various isocyanate reactive compounds can be used to form an isocyanate reactive component, which, in turn, can be used to form the activatable material. Isocyanate-reactive compounds suitable for the expandable material generally include from about 1 to about 8 or more isocyanate-reactive groups and preferably from about 2 to about 6 isocyanate-reactive groups. Suitable compounds include polyacetals, polycarbonates, polyesterethers, polyester carbonates, hydrocarbons polythioethers, polyamides, polyols (e.g., di- or polyhydric alcohols) such as polyethers, glycols, polyesters and castor oil, polyesteramides, polysiloxanes, polybutadienes, and polyacetones. The isocyanate-reactive compounds typically contain from about 2 or fewer to about 4 or greater reactive amino or hydroxyl groups. Isocyanate-reactive compounds can be included in the isocyanate-reactive component in an amount of from about 5 to about 100% by weight (based on total weight of isocyanate-reactive component), more typically from about 10 to about 90% by weight and even more typically from about 40 to about 80% by weight. Preferably, although not required, the above isocyanate-reactive compounds can create a blowing effect by liberating a gas (e.g., $CO_2$) upon reaction with the isocyanate.

As discussed, the expandable material can include materials having a relatively high molecular weight for assisting in providing self support characteristics to the material. These polymeric materials may be selected from any of the materials discussed herein such as phenoxy resins, urethanes, elastomers, rubbers (e.g., nitrile rubber), isocyanate reactive compounds, polyamides, polyamide alloys, ethylene copolymers (e.g., EVA or EMA), solid epoxy resins, epoxy/rubber adducts (e.g., carboxylated nitrile rubber/epoxy adducts or CTBN/epoxy adducts), combinations thereof or the like. One preferred material is an epoxy based material and more preferably is a solid bisphenol A epoxy resin.

When included, the percentage of polymeric material in the activatable material having a relatively high molecular weight is preferably at least about 30% by weight but can be less, more preferably at least about 50% by weight and even more preferably at least about 65% by weight. As used herein, a relatively high molecular weight is intended to mean a molecular weight high enough to maintain the polymeric material in a solid state at about room temperature (e.g., between about 5° C. and about 50° C.). For example, relatively high molecular weights for an epoxy-based material (e.g., a bisphenol epoxy based material) are typically greater than about 1000 or less, more typically greater than about 1200 and even more typically greater than about 1400, 2000 or even 2750. Relatively high weights for polyamide or polyamide blends are typically greater than about 10,000 or less, more typically greater than about 20,000 and even more typically greater than about 30,000, 40,000 or even 50,000.

The polymeric material is typically at least about 25%, more typically at least 40% and even more typically at least 60, 70, 80% or more by weight of the expandable material. Of course smaller amounts may be used within the scope of the present invention unless otherwise specifically stated.

Toughened Thermoplastic

The expandable material could also include one or more toughened thermoplastic materials. Example of thermpoplastics that can be toughened include, without limitation, polyolefin (e.g., polyethylene), polypropylene ethylene methacrylate, ethylene vinyl acetate, thermoplastic epoxy resin, polyester, polyamide, combinations thereof or the like and such thermoplastic can be toughened with a toughening material such as tougher thermoplastic, elastomer, thermoplastic elastomer or a combination thereof.

One preferred toughened thermoplastic is a thermoplastic epoxy resin (TPER) reacted and/or toughened with a toughening polymer such as a thermoplastic polyolefin or elastomer. Examples of such TPER materials are poly(hydroxy ethers) or polyetheramines and more particularly, thermoplastic hydroxyl-functionalized polyetheramines (e.g., polyhydroxy amino ethers (PHAE)), which are particularly suitable as thermoplastics for the present invention. These polyetheramines are typically formed through the reaction of one or more polyfunctional and preferably difunctional amines with one or more polyfunctional and preferably difunctional epoxy resins for forming a primarily (i.e., at least 70, 80, 90% or more) linear hydroxyl-functionalized polyetheramine resin. Advantageously, the molecular weight of the polyetheramine resin can be modified by varying the reactant ratios of amine to epoxy. Additional examples of suitable PHAEs are disclosed in U.S. Pat. Nos. 5,275,853 and 5,464,924, which are incorporated herein by reference for all purposes.

Such original thermoplastic polymers may be toughened with one or more other toughening polymers (e.g., tougher thermoplastic, elastomer, both or the like), which can be reacted or grafted onto the original thermoplastic. Such suitable or original thermoplastic polymers (e.g., thermoplastic epoxy resins such as PHAE), will include reactive or functional groups such as hydroxyl groups, epoxy groups, amine groups, combinations thereof or the like and the toughening polymers suitable for toughening those original thermoplastics will include (e.g., have been modified to include) chemical functional groups such as carboxylic acids, maleic acids or both that are reactive with the functional groups of the original thermoplastic. Examples of toughening polymers that can be modified to include such chemical functional groups include, without limitation, tougher thermoplastics such as polyolefin (e.g., polyethylene), ethylene containing polymer, polyester, polyacrylate, polyacetate, thermoplastic polyolefin (e.g., ethylene methacrylate (EMA), ethylene vinyl acetate (EVA) or both), combinations thereof or the like and/or elasomer such as polyisoprene, polybutadiene or both.

In one preferred embodiment, a thermoplastic epoxy resin (e.g., PHAE) in accordance with the previous description of thermoplastic epoxy resins is toughened with a toughening polymer such as thermoplastic acetate (EVA), thermoplastic acetate (EMA) or both by mixing and/chemically reacting the reactive or functional TPER described above with the toughening polymer where the toughening polymer is functionalized with one or more amine, hydroxyl and/or epoxy reactive groups such as epoxide groups, carboxylic acid groups, maleic acid groups, anhydride groups, combinations thereof or the like. One example of such a functionalized toughening polymer (e.g., a relatively tougher thermoplastic) is a glycidyl methacrylate modified ethylene methacrylate polymer (e.g., copolymer or terpolymer) sold under the tradename LOTADER AX8950, commercially available from Arkema Chemicals. Another example of such a functionalized toughening polymer (e.g., a relatively tougher thermoplastic) is a maleic anhydride modified ethylene vinyl acetate sold under the tradename FUSABOND MC 190D or MC 250D, both commercially available from DuPont. Yet another example of a functionalized toughening polymer (e.g., an elastomer, thermoplastic or combination thereof) is an ethylene butyl acrylate modified with maleic anhydride sold under the tradename LOTADER 3410, also commercially available from Arkema Chemicals.

It shall be understood that such toughening polymer can be reacted with or into (e.g., grafted onto) the original thermoplastic chain of the original thermoplastic according in a variety of ways. Thus, the toughening polymer can be reacted into the original thermoplastic chain itself, can be pendant relative to the original thermoplastic chain, can be the end of the original chain or otherwise. Such location of the toughening polymer will typically depend upon the location of the reactive group (e.g., amine or hydroxyl groups) of the original thermoplastic (e.g., TPER), the location of the reactive groups (e.g., epoxide groups, anhydride groups or both) on the tougher thermoplastic (e.g., EVA, EMA or combination thereof) or both. Thus, the toughened thermoplastic is an original thermoplastic/tougher thermoplastic adduct or reaction product (e.g., a TPER/Polyolefin polymer (e.g., copolymer, terpolymer or both)). Examples includes TPER/EVA (e.g., PHAE/EVA) copolymer and TPER/EMA (e.g., PHAE/EMA) copolymer.

The original thermoplastic and the toughening polymer may be mixed and/or reacted according to a variety of protocols. According to a preferred embodiment, the original thermoplastic is melt mixed in an extruder (e.g., a 25 mm twin screw extruder) or batch mixer with the tougher thermoplastic to react the thermoplastics as described. The desired temperature for this mixing can vary depending upon the thermoplastics and/or polymers to be mixed and reacted, but are typically above the $T_g$ of the TPER, above the $T_m$ of the toughening polymer or and about 500° F., more typically between about 300° F. and about 420° F. and still more typically between about 340° F. and about 400° F. Toughening in this manner allows intermixing and reacting of the original thermoplastic and the toughening polymer (e.g., tougher thermoplastic) wherein one or both of the original thermoplastic and the toughening polymer are solids at room temperature (23° C.) and their reaction product is also a solid at room temperature. Such solids can be provided as masses (e.g., pellets, chunks or the like) that can be convenient for formation, processing or the like. Advantageously, such toughened thermoplastic materials can assist in providing self supporting characteristics and/or impact strength to the products formed according to the present invention.

Examples of suitable toughened thermoplastics (e.g., toughened TPERs) are disclosed in U.S. patent application Ser. No. 60/747,677, titled Toughened Polymeric Material and Method of Forming and Using the same, filed May 19, 2006 and U.S. patent application Ser. No. 60/862,113 filed on the same date as the present application and having the same title as the previous application, both applications being incorporated herein by reference for all purposes.

Curing Agents and Accelerators

The curing agents and accelerators in the expandable material, as will be recognized by the skilled artisan, will typically depend upon the polymeric materials to be cured. Amounts of curing agents and curing agent accelerators can vary widely within the expandable material depending upon the type of cellular structure desired, the desired amount of expansion of the expandable material, the desired rate of expansion, the desired structural properties of the expandable material and the like. Exemplary ranges for the curing agents or curing agent accelerators present in the expandable material range from about 0.1% by weight to about 7% by weight.

Useful classes of curing agents include materials selected from aliphatic or aromatic amines or their respective adducts, amidoamines, polyamides, cycloaliphatic amines, (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole, 4,4' methylene bis(phenyl dimethyl urea) or a combination thereof) may also be provided for preparing the expandable material.

Other suitable catalysts or curing agents include tertiary amines and metal compounds. Suitable tertiary amine catalysts include triethylamine, tributylamine, N-methylmorpholine, N-ethylmorpholine, N, N, N', N'-tetramethylethylene diamine, pentamethyldiethylene triamine, and higher homologs, 1,4-diazabicyclo[2.2.2]octane, N-methyl-N'-(dimethylaminoethyl)piperazine, bis(dimethylaminoalkyl) piperazines, N, N-dimethylbenzylamine, N, N-dimethylcyclohexylamine, N,N-diethylbenzylamine, bis(N,N-diethylaminoethyl) adipate, N,N,N',N'-tetramethyl-1,3-butanediamine,N,N-dimethyl-.beta.phenylethylamine, 1-methyl imidazole, 1,2-dimethylimidazole, 2-methylimidazole, monocyclic and bicyclic amidines, bis(dialkylamino) alkyl ethers (U.S. Pat. No. 3,330,782), and tertiary amines containing amide groups (preferably formamide groups). The catalysts used may also be the known Mannich bases of secondary amines (such as dimethylamine) and aldehydes (preferably formaldehyde) or ketones (such as acetone) and phenols.

As suggested, faster curing agents and/or accelerators can be particularly desirable for shortening the time between onset of cure and substantially full cure (i.e., at least 90% of possible cure for the particular activatable material) and curing the expandable material while it maintains its self supporting characteristics. As used herein, onset of cure is used to mean at least 3% but no greater than 10% of substantially full cure that is experienced during activation of the expandable material. For the present invention, it is generally desirable for the time between onset of cure and substantially full cure to be less than about 30 minutes, more typically less than about 10 minutes and even more typically less than about 5 minutes. It should be noted that more closely correlating the time of softening of the polymeric materials, the time of curing and the time of bubble formation or blowing can assist in allowing for activation of the expandable material without substantial loss of its self supporting characteristics. Generally, it is contemplated that experimentation by the skilled artisan can produce desirable cure times using various of the curing agents and/or accelerators discussed above or others. It has been found that for a dicyanamide curing agent or other agents used for cure during activation, other curing agents or accelerators such as a modified polyamine (e.g., cycloaliphatic amine) sold under the tradename ANCAMINE 2441 or 2442 or 2014 AS; an imidazole (e.g., 4-Diamino-6 [2'-methylimidazoyl-(1')ethyl-s-triazine isocyanuric) sold under the tradename CUREZOL 2MA-OK, both commercially available from Air Products; an amine adduct sold under the tradename PN-23, an adipic hydrazide sold under the tradename ADH both commercially available from Ajinimoto or an adduct of imidazole and isocyanate sold under the tradename LC-65 and commercially available from A & C Catalyst can produce particularly desirable cure times.

Also, as suggested previously, the expandable material can be formulated to include a curing agent that at least partially cures the expandable material prior to activation of the material. Preferably, the partial cure alone or in combination with other characteristics or ingredients of the expandable material imparts sufficient self supporting characteristics to the expandable material such that, during activation (e.g., curing and/or foaming), the expandable material, which is typically shaped as a part, merely expands volumetrically without significantly losing it shape.

In one embodiment, the expandable material includes a first curing agent and, optionally, a first curing agent accelerator and a second curing agent and, optionally, a second curing agent accelerator, all of which are preferably latent. The first curing agent and/or accelerator are typically designed to partially cure the expandable material during processing (e.g., mixing, shaping or a combination thereof) of the expandable material for at least assisting in providing the expandable material or a part made therefrom with the desirable self supporting properties. The second curing agent and/or accelerator will then typically be latent such that they cure the expandable material upon exposure to a condition such as heat, moisture or the like.

As one preferred example of this embodiment, the second curing agent and/or accelerator are latent such that one or both of them cure the polymeric materials of the expandable material at a second or activation temperature or temperature range. However, the first curing agent and/or accelerator are also latent, but either or both of them partially cure the expandable material upon exposure to a first elevated temperature that is below the second or activation temperature.

The first temperature and partial cure will typically be experienced during material mixing, shaping or both. For example, the first temperature and partial cure can be experienced in an extruder that is mixing the ingredient of the expandable material and extruding the expandable material through a die into a particular shape. As another example, the first temperature and partial cure can be experienced in a molding machine (e.g., injection molding, blow molding compression molding) that is shaping and, optionally, mixing the ingredients of the expandable material. The first curing agent for such and embodiment could be a curing agent that due to its chemical make-up has a particular heat at which is cures or it could be a lower temperature curing agent that is encapsulated in a material such as a thermoplastic that fails (e.g., melts or ruptures) at the conditions of processing.

In one embodiment, it is contemplated that a mixer or extruder (e.g., a twin screw extruder) can feed expandable material to an injection molding unit. The extruder could feed the injection molding unit directly or could feed a reservoir, which in turn feed an injection molding unit. In such an embodiment, partial cure or cross-link could occur in the extruder, the reservoir, the injection molding unit or a combination thereof.

The second or activation temperature and substantially full cure could then be experienced during a temperature experienced during processing of the article of manufacture to which a part of the expandable material has been applied. For example, in the automotive industry, e-coat and paint ovens can provide activation temperatures. Typically, it is desirable for the expandable material to additionally expand at the activation temperature as is described more in detail further below.

In this embodiment, partial cure may be effected by a variety of techniques. For example, the first curing agent and/or accelerator may be added to the expandable material in sub-stoichiometric amounts such that the polymeric material provide substantially more reaction sites than are actually reacted by the first curing agent and/or accelerator. Preferred sub-stoichiometric amounts include an amount of first curing agent and/or accelerator that can cause the reaction of no more than 60%, no more than 40% or no more than 30%, 25% or even 15% of the available reaction sites provided by the polymeric material. Alternatively, partial cure may be effected by providing a first curing agent and/or accelerator that can only react with a percentage of the polymeric material such as when multiple different polymeric materials are provided and the first curing agent and/or accelerator are only reactive with one or a subset of the polymeric materials. In such an embodiment, the first curing agent and/or accelerator is typically reactive with no more than 60%, no more than 40% or no more than 30%, 25% or even 15% by weight of the polymeric material. Generally speaking, lower amounts of partial cure typically allow for greater expansion and better adhesion while greater amounts often provide greater self support.

In another embodiment, the activatable material may be formed using a two component system that partially cures upon intermixing of the first component with the second component. In such an embodiment, a first component is typically provided with a first curing agent, a first curing agent accelerator or both and the second component is provided with one or more polymeric materials that are cured (e.g., cross-linked) by the curing agent and/or accelerator upon mixing of the first and second component. Such mixing will typically take place at a temperature below 140 or 150° C. (e.g., from about 10° C. to about 120° C.).

Like the previous embodiments, the partial cure, alone or in combination with other characteristics or ingredients of the expandable material, imparts sufficient self supporting characteristics to the expandable material such that, during activation and/or foaming, the expandable material, which is typically shape as a part, merely expands volumetrically without significantly losing it shape.

Also like the previous embodiments, partial cure may be effected by a variety of techniques. For example, the first curing agent and/or accelerator may, upon mixing of the first component and second component, be present within the expandable material in sub-stoichiometric amounts such that the polymeric material provide substantially more reaction sites than are actually reacted by the first curing agent and/or accelerator. Preferred sub-stoichiometric amounts includes having an amount of first curing agent and/or accelerator that can cause the reaction of no more than 60%, no more than 40% or no more than 30%, 25% or even 15% of the available reaction sites provided by the polymeric material. Alternatively, partial cure may be effected by providing a first curing agent and/or accelerator that can only react with a percentage of the polymeric material such as when multiple different polymeric materials are provided and the first curing agent and/or accelerator are only reactive with one or a subset of the polymeric materials. In such an embodiment, the first curing agent and/or accelerator is typically reactive with no more than 60%, no more than 40% or no more than 30%, 25% or even 15% by weight of the polymeric material.

The other ingredients (i.e., the additional polymeric materials, filler, other additives, the blowing agents and/or accelerators or the like) of the expandable material may be part of the first or second components of the two component system. Typically, the other additional ingredients will be split between the components in a manner that allows for reasonably thorough mixing of the first component with the second component. Generally, this will help the expandable material to be substantially homogeneous.

The expandable material formed by the two component system can be shaped according any of the techniques described herein (e.g., extrusion through a die, injection molding or the like). According to one preferred embodiment, however, the first and second components are both provided to and mixed within a die that has one or more cavities that shape the expandable material as it is mixed and/or partially cured. As such, it is contemplated that the two component material may be shaped by high or low pressure casting or reaction injection molding.

Generally, it is contemplated that any of the curing agents and/or curing agent accelerators discussed herein or others may be used as the first and second curing agents for the expandable materials and the agents or accelerators used will typically depend upon the desired conditions of partial cure and the desired conditions of activation. However, it has been found that, for the first curing agent, amines such as hindered amines (e.g., sterically hindered), which can be a modified polyamine (e.g., cycloaliphatic amine) sold under the tradename ANCAMINE 2337 or 2014 commercially available from Air Products, Inc. are particularly useful. Curing agents may also be chemically blocked or hindered. Other desirable first curing agents are those that cure the polymeric materials at temperatures of mixing, formation and/or shaping (e.g., extrusion, molding or the like) of the expandable material. Thus, curing agents that typically cure the polymer materials at temperatures greater than 30° C., but possibly less, more typically greater than 50° C. and even more typically greater than 70° C. and/or temperatures less than 150° C., more typically less than 120° C. and even more typically less than 100° C. It is also contemplated that the first or second curing agents can be ambient or elevated temperature curing agents that are encapsulated in a material such as a thermoplastic that fails (e.g., melts or ruptures) at the desired temperatures discussed herein or based upon other conditions such as pressure, to allow for the first or second cure.

Isocyanate reactive systems (e.g. polyurethane or polyol systems) may be designed as two component systems (i.e., a first curing agent that reacts upon mixing and a second upon exposure to a condition such as heat) or may have a first and second latent curing agent (i.e., a first and second curing agent that react upon exposure to one or more conditions such as a first temperature and a second higher temperature). Typically, the latent curing agents are blocked is some manner.

Preferably, although not required, the isocyanates are blocked such that the isocyanate component, the activatable material or both are substantially devoid of free unreacted (NCO) groups. For example, one of the above isocyanates can be reacted to form blocked isocyanates (e.g., inert adducts) such as urethanes, ureas, alophonate biuret etc., which, at elevated temperatures, can undergo trans-esterification reactions with the above isocyanate reactive compounds to form polyurethanes, which may be adhesives, foams, combinations thereof or the like. An example of one reaction between a blocked isocyanate and a polyol with the addition of heat is shown in reactive scheme I below:

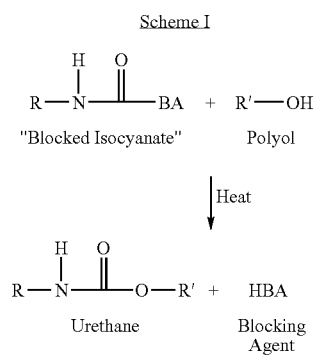

Typically, the isocyanates are blocked such that they do not react with isocyanate reactive compounds in the expandable material at relatively lower temperatures (e.g., temperatures below about 80° C., more typically below about 60° C. and even more typically below about 40° C.). However, the blocked isocyanates typically become unblocked at relatively higher temperatures (e.g., temperatures above about 100° C., more typically above about 120° C. and even more typically above about 160° C.). For unblocking the blocked isocyanates, the expandable material should typically be exposed to the elevated temperatures for at least about 10 minutes or less, more typically at least about 20 minutes (e.g., about 30 minutes) and even more typically at least about 45 minutes (e.g., about 60 minutes).

The isocyanates may be blocked using a variety of chemical compounds depending upon the desired temperature of unblocking. Pyrazoles such as 3,5 dimethyl pyrazole may be employed as the blocking agent when an unblocking temperature between about 100° C. and about 120° C. is desired. A ketoxime such as Methyl Ethyl Ketoxime may be employed as the blocking agent when an unblocking temperature between about 140° C. and about 200° C. is desired. An acid ester such as malonic acid ester may be employed as the blocking agent when an unblocking temperature between about 80° C. and about 100° C. is desired. In one preferred embodiment, a blocking agent such as caprolactam, alkylated phenol or both are employed to provide an unblocking temperature between about 150° C. and about 170° C. Isopropyl alcohol may also be employed as a blocking agent. Generally, it is contemplated that the activatable material of the present invention may include any of isocyanates discussed herein and the isocyanates may be blocked with any of the above blocking agents suitable for blocking the chosen isocyanate.

Exemplary blocked isocyanates include, without limitation, solventless TDI-prepolymers blocked with one or more alkylated phenols and optionally including a plasticizer. Examples of such isocyanates having unblocking temperatures greater than about 160° C. are sold under the tradenames TRIXENE BI 7772 or TRIXENE BI 7779 and are commercially available from Baxended Chemicals Ltd., Accrington, Lancashire BB5, 2SL, England. Another exemplary blocked isocyanate is a solventless powder dimeric 2,4-Toluene Diisocyanate sold under the tradename DESMODUR TT 44 C, which is commercially available from Rhein Chemie Corporation. Yet another exemplary blocked isocyanate is a solventless 1,6-Hexamethylene Diisocyanate Dimer/Trimer sold under the tradename DESMODUR N-3400, which is commercially available form Bayer AG, 51368 Leverkusen, Germany.

Other exemplary blocked isocyanates include isonate based prepolymers blocked with an oxime (e.g., 2-butanone oxime). Such isocyanates are sold under the tradenames P-1 ISONATE 50 OP MDI/PPG 2000 or P-2 ISONATE 50 OP MDI/Tone 0240. Another exemplary blocked isocyanate is isophorone diisocyanate blocked with isopropyl alcohol (IPDI/IPA).

In one particular embodiment, it is contemplated that the expandable material may include a single compound that includes a blocked isocyanate and a isocyanate reactive compound. As an example, the expandable material may include or be substantially exclusively formed of a blocked isocyanate that may also be classified as a polyol. One example of such a blocked isocyanate is a hydroxyl functional uretdion, which preferably does not contain any free NCO groups. Reaction scheme II below illustrated one such isocyanate being turned into a polyurethane by exposure to elevated temperatures which are typically higher than 150° C.

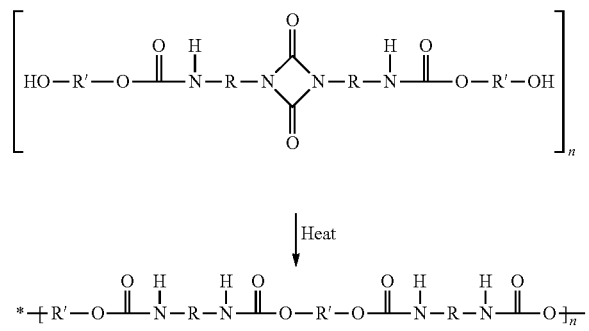

When the activatable material is heat-activated, the heat for activation may be supplied from a variety of sources such as microwave energy, ionizing radiation, an oven, a thermoelectric device, electrical energy, chemical reaction, combinations thereof or the like. In a preferred embodiment, the expandable material is processed along with an article of manufacture and the natural processing or assembly steps employed to create the article will provide the heat. For example, the expandable material may be applied to a structure of an automotive vehicle (e.g., according to techniques further described below) and may be activated by coating (e.g., e-coating) or painting operations such as e-coat oven bake, primer oven bake, paint oven bake, combinations thereof or the like. Exemplary temperatures encountered in an automobile assembly body shop oven, e-coat oven, paint oven or the like may be in the range of about 148.89° C. to about 204.44° C. (300° F. to 400° F.).

Whether the activatable material is partially cured or not, the material can include polymer/curing agent combinations that are designed to cure quickly enough such that the activatable material remains self supporting during its cure period. As an example thermoplastic epoxies or Poly(hydroxy ethers) or polyetheramines cured with isocyanates (e.g., MDI, TDI or the like). Additional potential polymers for such a fast cure system are disclosed in U.S. Pat. Nos. 5,275,853; 5,164,472; 5,464,942; 5,401,814; 5,834,078; 5,962,093; 6,589,621; 6,180,715, all of which are incorporated herein by reference for all purposes. Preferably, the polymers employed have a relatively high molecular weight. Curing times for these system are preferably that same from onset of cure to substantially full cure as those curing times already discussed herein.

Blowing Agents and Accelerators

One or more blowing agents may be added to the expandable material for producing inert gasses that form, as desired, an open and/or closed cellular structure within the expandable material. In this manner, it may be possible to lower the density of articles fabricated from the material. In addition, the material expansion helps to improve sealing capability, substrate wetting ability, adhesion to a substrate, acoustic damping, combinations thereof or the like.

The blowing agent may include one or more nitrogen containing groups such as amides, amines and the like. Examples of suitable blowing agents include azodicarbonamide, dinitrosopentamethylenetetramine, 4,4$_i$-oxy-bis-(benzenesulphonylhydrazide) (OBSH), trihydrazinotriazine and N, N$_i$-dimethyl-N, N$_i$-dinitrosoterephthalamide.

Some preferred blowing agents are hydrazides or azodicarbonamides sold under the tradenames CELOGEN® OT and CELOGEN® AZ, commercially available from Crompton, Inc. Preferred physical blowing agent are solvents encapsulated in thermoplastic and sold under the tradename EXPANCEL and commercially available from Akzo Nobel.

An accelerator for the blowing agents may also be provided in the expandable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles, ureas or the like.

Amounts of blowing agents and blowing agent accelerators can vary widely within the expandable material depending upon the type of cellular structure desired, the desired amount of expansion of the expandable material, the desired rate of expansion and the like. Exemplary ranges for the amounts of blowing agents and blowing agent accelerators in the expandable material range from about 0.1% by weight to about 5 or 10% by weight and are preferably in the expandable material in fractions of weight percentages.

In one embodiment, the present invention contemplates the omission of a blowing agent. Thus it is possible that the material will not be an expandable material. Preferably, the formulation of the present invention is thermally activated. However, other agents may be employed for realizing activation by other means, such as moisture, radiation, or otherwise.

Fillers

The expandable material may also include one or more fillers, including but not limited to particulated materials (e.g., powder), beads, microspheres, or the like. Preferably the filler includes a relatively low-density material that is generally non-reactive with the other components present in the expandable material.

Examples of fillers include silica, diatomaceous earth, glass, clay, talc, pigments, colorants, glass beads or bubbles, glass, carbon ceramic fibers, antioxidants, and the like. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers. It has been found that, in addition to performing the normal functions of a filler, silicate minerals and mica in particular improved the impact resistance of the cured expandable material.

When employed, the fillers in the expandable material can range from 10% to 90% by weight of the expandable material. According to some embodiments, the expandable material may include from about 0.001% to about 30% by weight, and more preferably about 10% to about 20% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 20%, and still more preferably approximately 13% by weight of the expandable material.

It is contemplated that one of the fillers or other components of the material may be thixotropic for assisting in controlling flow of the material as well as properties such as tensile, compressive or shear strength.

Certain fillers, which may or may not be thixotropic, can assist in providing self supporting characteristics to the expandable material. Preferred examples of such fillers include, without limitation, glass, carbon fibers, graphite, natural fibers, chopped or continuous glass, ceramic, aramid, or carbon fiber or the like.

Other preferred fillers that can provide self support include wollastonite (e.g., a calcium silicate having a needle-like structure with an aspect ratio of 3:1 to 20:1), aramid pulp or the like. Still other examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed. A clay or mineral filler that can provide desirable rheological characteristic and includes a blend of organically modified minerals is sold under the tradename GARAMITE commercially available from Southern Clay Products.

Additives

Other additives, agents or performance modifiers may also be included in the expandable material as desired, including but not limited to a UV resistant agent, a flame retardant, an impact modifier, a heat stabilizer, a UV photoinitiator, a colorant, a processing aid, a lubricant, a reinforcement. chopped or continuous glass, ceramic, aramid, or carbon fiber or the like). As one example, the material can include moisture scavenger such as a metal oxide (e.g., calcium oxide).

Examples of suitable formulations for the activatable material are provided in Table I, II, III below:

| Ingredients | Wt. Percent (formula A) | Wt. Percent (formula B) |
|---|---|---|
| CTBN/epoxy adduct | 14.13 | |
| Toughened TPER | | 9.52 |
| Polyamide alloy | 14.13 | 15.87 |
| Liquid epoxy resin/aramid fiber (50:50) | | 2.22 |
| Aramide Pulp (Kevlar or Twaron) | 1.41 | |
| Solid Epoxy Resin (500–560 EEW) | 9.04 | |
| Solid Epoxy Resin (575–685 EEW) | 14.13 | |
| Solid Epoxy Resin (875–955 EEW) (type 4) | 8.48 | 40.63 |
| Epoxy/Elastomer adduct | 5.65 | |
| Recycled Rubber (fine powder) | 2.83 | |
| Calcium Carbonate | 8.48 | 21.28 |
| Glass Spheres (hollow, solid or both) | 8.48 | 2.73 |
| Wollastonite | 8.49 | 3.81 |
| Pulverized Dicyandiamide | 1.81 | 1.4 |
| Curing Agent and/or Accelerator (modified aliphatic amine) | 0.85 | 0.63 |
| Latent Curing Agent and/or Accelerator (aliphatic amine) | 0.17 | |
| Blowing Agent Accelerator (urea) | 0.62 | 0.51 |
| Blowing Agent (OBSH) | | |
| Blowing Agent (azodicarbonamide) | 1.13 | 1.27 |
| Pigment | 0.17 | 0.13 |
| | 100.00 | 100.00 |

Above, exemplary formulations of the expandable material are provided. Since they are merely exemplary, it is contemplated that the weight percents of the various ingredients or properties (e.g., EEWs) may vary by ±50% or more or by ±30% or ±10%. For example, a value of 50 ±10% is a range of 45 to 55. Moreover, ingredients may be added or removed from the formulations.

Properties

Generally, it is desirable for the expandable or activatable materials of the present invention to have certain properties either prior to, during or after activation, however, such properties are not required unless otherwise stated. Moreover, values above and below the following ranges are contemplated as being within the present invention unless otherwise stated. Furthermore, the properties may be determined according to ASTM standards.

Prior to full cure, the activatable or expandable material typically has a density greater than 0.2 g/cc, more typically greater than 0.6 g/cc and even more typically greater than 0.9 g/cc and also typically less than 4.0 g/cc more typically less than 2.0 g/cc and even possibly less than 1.3 g/cc. Prior to full cure, the activatable or expandable material typically has a viscosity at 100° C. and 200 1/sec. greater than 1000 Pa*sec, more typically greater than 1900 Pa*sec and even more typically greater than 2800 Pa*sec and also typically less than 5000 Pa*sec more typically less than 3900 Pa*sec and even more typically less than 3000 Pa*sec. Prior to full cure, the activatable or expandable material typically has a viscosity at 100° C. and 400 1/sec. greater than 800 Pa*sec, more typically greater than 1500 Pa*sec and even more typically greater than 2000 Pa*sec and also typically less than 3500 Pa*sec more typically less than 2800 Pa*sec and even more typically less than 2200 Pa*sec. Prior to full cure, the activatable or expandable material typically has a viscosity at 100° C. and 600 1/sec. greater than 500 Pa*sec, more typically greater than 1100 Pa*sec and even more typically greater than 1600 Pa*sec and also typically less than 3200 Pa*sec more typically less than 2400 Pa*sec and even more typically less than 1800 Pa*sec. Prior to full cure, the activatable or expandable material typically has a viscosity at 120° C. and 200 1/sec. greater than 100 Pa*sec, more typically greater than 500 Pa*sec and even more typically greater than 850 Pa*sec and also typically less than 2000 Pa*sec more typically less than 1400 Pa*sec and even more typically less than 1000 Pa*sec. Prior to full cure, the activatable or expandable material typically has a viscosity at 120° C. and 400 1/sec. greater than 70 Pa*sec, more typically greater than 400 Pa*sec and even more typically greater than 650 Pa*sec and also typically less than 1600 Pa*sec more typically less than 1000 Pa*sec and even more typically less than 760 Pa*sec. Prior to full cure, the activatable or expandable material typically has a viscosity at 120° C. and 600 1/sec. greater than 50 Pa*sec, more typically greater than 300 Pa*sec and even more typically greater than 500 Pa*sec and also typically less than 1300 Pa*sec more typically less than 900 Pa*sec and even more typically less than 700 Pa*sec.

After full cure, the activated material typically has a density greater than 0.08g/cc, more typically greater than 0.20 g/cc and even more typically greater than 0.40 g/cc and also typically less than 2.0 g/cc more typically less than 1.0 g/cc and even more typically less than 0.6 g/cc. The expandable material typically expands to a volume that is typically at least 101%, more typically at least 130%, still more typically 190% and also typically less than 1000%, more typically less than 500% and even more typically less than 325% of its original unexpanded volume. After full cure, the material preferably exhibits a lap shear greater than 50 psi, more typically greater than 150 psi and even more typically greater than 300 psi and also typically less than 3000 psi more typically less than 1400 psi and even more typically less than 800 psi. After full cure, the material typically exhibits a modulus of greater than 50 MPa, more typically greater than 120 MPa and even more typically greater than 200 MPa and also typically less than 3000 MPa more typically less than 1300 MPa and even more typically less than 800 MPa. Moreover, after full cure, the material typically exhibits a peak stress greater than 0.2 MPa, more typically greater than 1.0 MPa and even more typically greater than 2 MPa and also typically less than 200 MPa more typically less than 70 MPa and even more typically less than 20 MPa. After full cure, the material also typically exhibits elongation greater than 0.01%, more typically greater than 0.4% and even more typically greater than 1% and also typically less than 70% more typically less than 20% and even more typically less than 8%.

The expandable material, at about room temperature (23° C.), can be substantially tack-free and/or dry to the touch according to the formulations presented herein. It can also have various degrees of tack as well, however, the substantially tack-free material can be advantageous for ease of handling.

Mixing and Shaping

As suggested, various types of mixing and shaping techniques may be employed for forming and shaping the expandable materials. Examples include extrusion, batch mixing, molding (e.g., compression molding, injection molding, blowmolding) or the like. According to one embodiment, the ingredients of the expandable material are provided separately, together or as subsets of materials to an extruder and mixed within the extruder. In such an embodiment, the expandable material may partially cure in the extruder due to material mixing and/or due to the heat of mixing. Then, the material may be shaped by an extruder die or orifice and may be further cut to a desired shape. Alternatively, the expandable material may be mixed and extruded and cut into pellets such that the expandable material can be fed to an injection molding machine and further shaped and preferably partially cured. Of course, the expandable material may be provided to a molding machine in other ways as well (e.g. as ingredients liquid or the like.)

It is also contemplated that the expandable material may be formed or shaped to include one or more fasteners that are integrally formed of the expandable material or one or more fasteners can be attached to the expandable material before or after it has been shaped as a part. Advantageously such fasteners can assist in locating the shaped expandable parts relative to articles of manufacture.

Generally, parts formed according to the present invention are typically substantially entirely formed of expandable material and can be applied to structures of articles of manufacture without supports such as molded carriers, although not required unless otherwise stated. Typically, the parts of the present invention are at least 50%, more typically at least 70% and even more typically at least 80, 90 or even at least 95 or 99.5% by weight expandable material upon application of the part to a structure of an article of manufacture.

Referring to FIG. 1, there is illustrated a part 10 formed of an expandable material in accordance with an aspect of the present invention. As can be seen, the part 10 is being applied to a structure 12 (e.g., a pillar, frame member, body member or the like) of an article of manufacture (e.g., a transportation or automotive vehicle). The expandable part 10 is illustrated as being substantially continuously solid and homogeneous from a first end 20 to a second end 22 along a length of the part 10. The part 10 is also shown to have one or more sloping walls 30 extending partially or substantially fully along the length of the part 20. The part 10 is generally conical or frusto-conical, but could be shaped in a variety of different configurations such as cylindrical, cube, pyramidal, non-geometric or the like. Typically, although not required, the part 10 has a shape that substantially corresponds to a cavity 34 of the structure 12 into which the part 10 is to be inserted.

Assembly of the expandable part 10 to the structure 12 generally involves placement of the part 10 adjacent the structure, but more preferably includes insertion of the part within the cavity 34 of the structure 12. As shown, the part 10 includes at least one (e.g., one, two, three or more) fasteners 38, which can assist in at least temporarily attaching the part 10 to the structure 12. Such fasteners 38 may be integrally formed with the rest of the part 10 of expandable material. For example, a die of a molding machine may form the fasteners 38. Alternatively, the fasteners 38 may be formed of a different material such as a metal or thermoplastic and may be connected to the expandable material of the part 10 using a variety of techniques. As one example, the expandable material may be shaped (e.g., insert molded) about a portion of the fasteners 38 such that the fasteners 38 attach to the expandable material of the part 10. Upon assembly of the part 10 to the structure 12, the fasteners 38 can be interferingly located in openings (e.g., cavities, through-holes or the like) of the structure 12 or article of manufacture such that the expandable part 10 is located in a predetermined location relative to the structure 12 (e.g., within the cavity 34).

After assembly of the expandable part 10 to the structure 12, the part 10 is typically activated to expand (e.g., foam) and cure (e.g., thermoset). Activation is typically caused by exposure to a condition such as pressure, moisture, radiation or the like. Preferably, the expandable part 10 activates upon exposure to heat and more particularly upon exposure to temperatures frequently experienced in an e-coat or paint oven for automotive vehicles. A part 10 according to the present invention may volumetrically expand a variety of different degrees depending upon the purpose and formulation of the part and/ or material of the part. For reinforcement purposes, it is typically preferable for the expandable material of the part to expand to a volume that is at least 102%, more typically 115% and even more typically 140% relative to its original unexpanded volume and it is also typically preferable for the expandable material of the part to expand to a volume that is less than 1000%, more typically less than 500% and even more typically less than 300% relative to its original unexpanded volume.

Upon activation, the part 10 typically expands to contact, whet and adhere to walls of the structure 12 and typically walls that define the cavity 34 of the structure 12. In the embodiment of FIG. 1, the part will typically substantially entirely fill cross-sections of the cavity 34 along a length of the cavity 34, although not required. The part 10, after activation, can provide sealing, baffling, dampening, or other properties to the structure 12. Preferably, the part provides substantial reinforcement to the structure 12.

Figure 2:
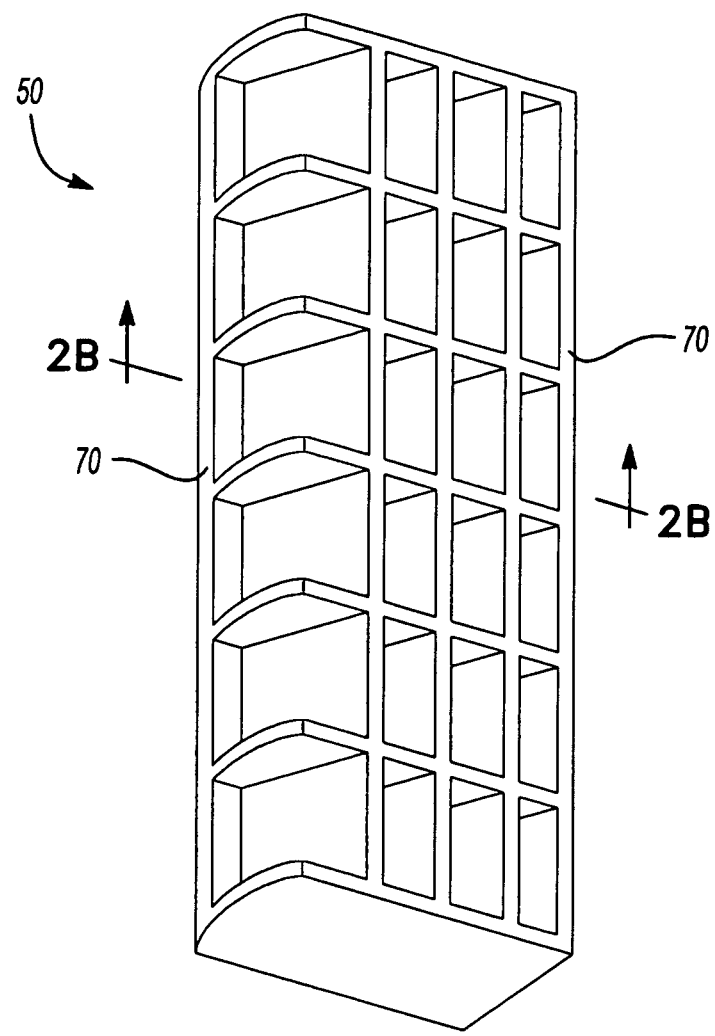
FIG. 2 is a perspective view of another shaped part formed of expandable material in accordance with an aspect of the present invention.
Figure 2:
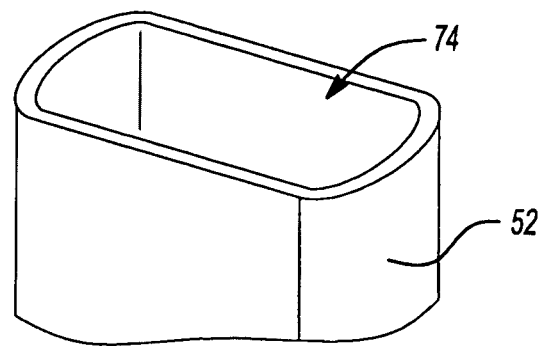

Referring to FIG. 2, there is illustrated another part 50 formed of an expandable material in accordance with an aspect of the present invention. As can be seen, the part 50 is being applied to a structure 52 (e.g., a pillar, frame member, body member or the like) of an article of manufacture (e.g., a transportation or automotive vehicle).

Figure 2B:
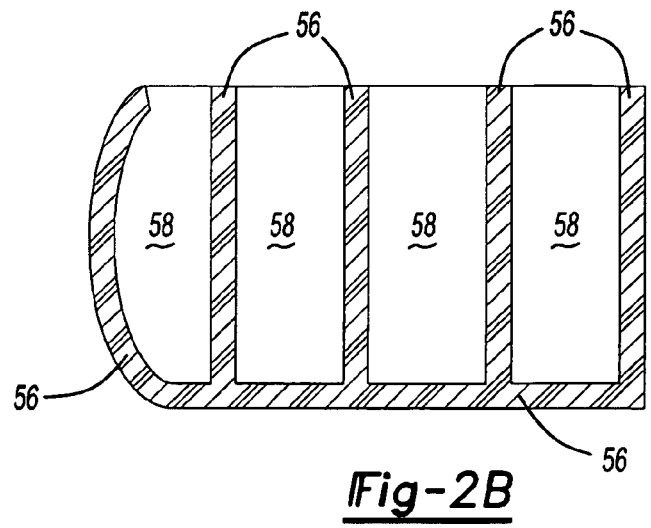
FIG. 2B is a cross section of the part of FIG. 2.

The expandable part 50 is illustrated as being generally skeletal or skeletal along its length. For defining the term skeletal as used herein only, the term intersection area refers to an area of a cross-sectional plane that intersects with expandable material and the term interstitial area refers to the area of the cross-sectional plane that does not intersect with the expandable material, but is located between portions of the intersection area. As an example, a cross-sectional plane is illustrated in FIG. 2B and shows intersection areas 56 and interstitial areas 58. Thus, a shaped part is skeletal in nature if, for at least 70% of all cross-sections through the part or perpendicular to an axis extending along a length of the part, the intersection area is less than 300%, less than 150%, less than 110% or less than 75, 50 or even 35% of the interstitial area for the cross-sections.

Of course, a skeletal part can expand to reduce the amount of interstitial area while still being consider to substantially retain its original non-expanded shape. After expansion, the intersection area is typically less than 500%, less than 350%, less than 210% or less than 175, 80 or even 55% of the interstitial area for the cross-sections It is also contemplated that a skeletal part can expand to substantially fill a section of a structure and leave very little or no interstitial area.

The part 50 is also shown to have one or more sloping walls 70 extending partially or substantially fully along the length of the part 50. The part 50 could be shaped in a variety of different configurations such as cylindrical, cube, pyramidal, non-geometric or the like. Typically, although not required, the part 50 has a shape that substantially corresponds to a cavity 74 of the structure 52 into which the part 10 is to be inserted.

Assembly of the expandable part 50 to the structure 52 generally involves placement of the part 50 adjacent the structure, but more preferably includes insertion of the part within the cavity 74 of the structure 52. The part 50 can includes at least one (e.g., one, two, three or more) fastener, which can assist in at least temporarily attaching the part 50 to the structure 52 such as those previously described for locating the part in a predetermined location relative to the structure 52 (e.g., within the cavity 74).

After assembly of the expandable part 50 to the structure 52, the part 50 is typically activated to expand (e.g., foam) and cure (e.g., thermoset). Activation is typically caused by exposure to a condition such as pressure, moisture, radiation or the like. Preferably, the expandable part 50 activates upon exposure to heat and more particularly upon exposure to temperatures frequently experienced in an e-coat or paint oven for automotive vehicles. A part 50 according to the present invention may volumetrically expand a variety of different degrees depending upon the purpose and formulation of the part and/or material of the part. For reinforcement purposes, it is typically preferable for the expandable material of the part to expand to a volume that is at least 102%, more typically 115% and even more typically 140% relative to its original unexpanded volume and it is also typically preferable for the expandable material of the part to expand to a volume that is less than 1000%, more typically less than 500% and even more typically less than 300% relative to its original unexpanded volume.

Upon activation, the part 50 typically expands to contact, whet and adhere to walls of the structure 52 and typically walls that define the cavity 34 of the structure 12. In the embodiment of FIG. 1, the part will typically substantially entirely fill cross-sections of the cavity 74 along a length of the cavity 74, although not required. The part 50, after activation, can provide sealing, baffling, dampening, or other properties to the structure 52. Preferably, the part provides substantial reinforcement to the structure 52.

While it is generally typically desirable for the material to adhere to surrounding walls of a structure upon activation. It may also be possible in certain application for the material to expand without any substantial adhesion and to substantially interference or friction fit within a structure upon expansion.

The shapes of the parts can vary widely depending upon the intended location and use of the part. For example, the shaped parts can have a central portion with extensions or ribs extending outward from the central portion. As another example, the parts can be formed with an outer peripheral portion (e.g., a tube or channel shaped portion) that defines an internal opening (e.g., a tunnel or channel) and ribs or cross-members may extend fully or partially across and/or through the internal opening.

Figure 3:
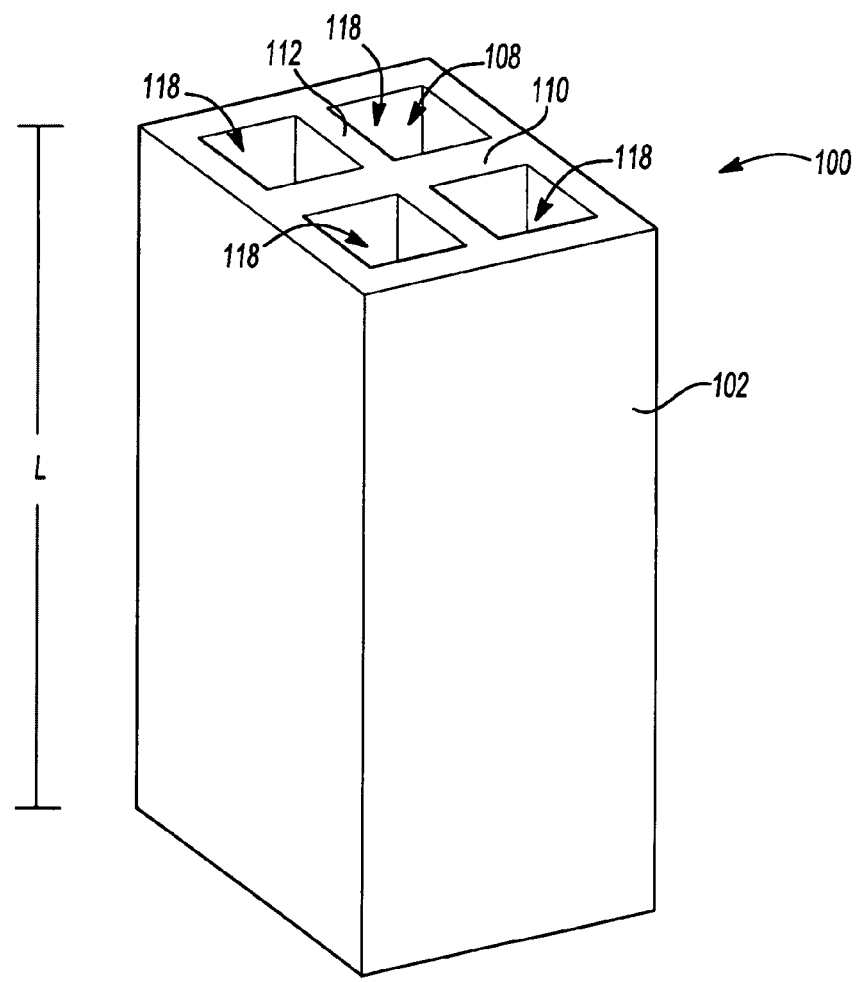
FIG. 3 is a perspective view of another shaped part formed of expandable material in accordance with an aspect of the present invention.

According to one preferred embodiment, one or more parts are formed by extruding the expandable material through an extrusion die to attain one or more desired cross-sectional shapes for the expandable material and then the extrudate or expandable material is cut when it reach a desired length. An example of such a part 100 is illustrated in FIG. 3. As shown, the part 100 has been extruded through a die to have an outer peripheral portion 102 that is shown as a tubular shape with rectangular or square cross-sections perpendicular to a length (L) of the part 100. Of course, this outer peripheral portion 102 could be channel shaped or otherwise shaped and can have other cross-sectional shapes such as circular, oval or the like which may be symmetrical or non-symmetrical. As shown, the outer peripheral portion 102 is substantially entirely continuous although it could be non-continuous and/or could include openings.

The outer peripheral portion 102 typically defines an internal opening 108 such as a cavity, a through-hole or the like. As shown, the internal opening 108 is a tunnel extending along the length (L) of the part 100. The internal opening 108 is shown as being substantially entirely enclosed except at the ends of the part 100, however, openings (e.g., through-holes or slits) could extend through the peripheral portion 102. The part 100 also includes ribs 110, 112 extending into and/or through the internal opening 108. The ribs can extend into the opening and stop or as shown, the ribs 110, 112 can intersect. The ribs can also divide the internal opening 108 into multiples sub-openings (e.g., cavities, channels or tunnels). In the embodiment illustrated, the internal opening 108 is divided into four tunnels 118 by two intersecting ribs 110, 112.

Figure 4:
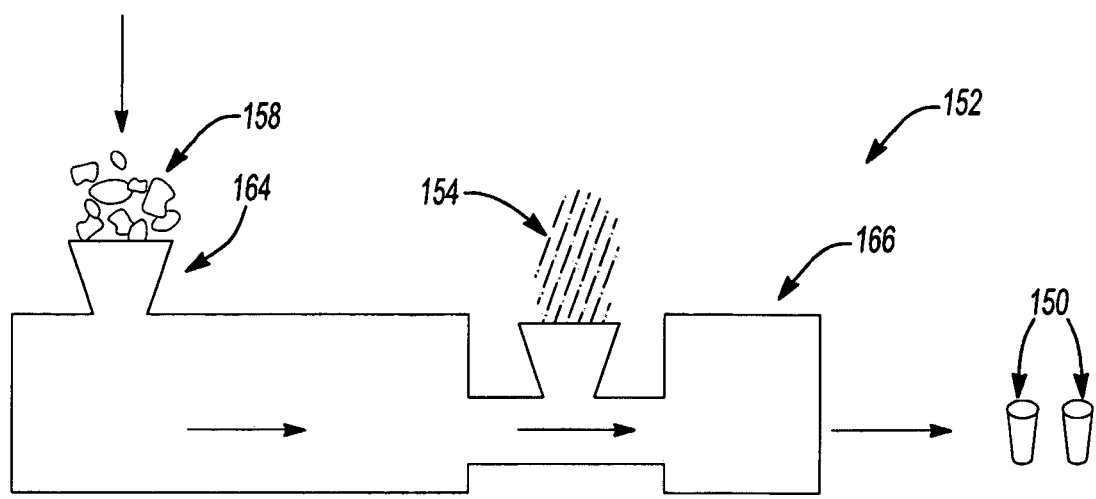
FIG. 4 is a side view of an exemplary process, machine or both for forming a part in accordance with an aspect of the present invention.

Referring to FIG. 4, it is also contemplated that parts 150 may be formed to include relatively long fibers, which can be carbon fibers, natural fibers, aramid fibers, glass fibers, combinations thereof or the like according to a pushtrusion process 152. As shown, pellets 158 of the expandable material are introduced to a feeder/mixer 164 (e.g., an extruder-like device with a rotating screw) and fibers 154 are introduced into the expandable material after the expandable material leaves the feeder/mixer 164. Thereafter, the expandable material with the fibers is introduced to a molding machine 166 to form parts 150 as shown. Such a pushtrusion process and or device are commercially available from Plasticomp, Winona, Minn. Advantageously, parts having average fiber length of at least 0.3, more typically at least 0.8 cm, even more typically at least 1.4 cm and even possibly at least 1.8 or even 2.5 cm can be formed.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of reinforcing a structure of an article of manufacture, the method comprising:
providing an initially solid pellet of expandable material including a first curing agent and having a self supporting characteristic during expansion thereof that is due to the presence of the first curing agent causing partial curing of the expandable material during processing of the pellet, and the inclusion of the following in the expandable material:
i) an acrylonitrile butadiene styrene copolymer material; and
ii) a thixotropic or fibrous filler;
injection molding the expandable material into a part;
inserting the part into a cavity that is at least partially defined by a structure of the article of manufacture; and
activating the expandable material to cure due to the presence of a second coring agent, so that the expandable material expands to a volume that is less than 500% relative to its original unexpanded volume and adheres to walls of the structure and provide structural reinforcement to the structure.

2. A method as in claim 1 wherein the expandable material is substantially tack-free to the touch.

3. A method as in claim 1 wherein the part, upon activation, forms a foam that exhibits a compressive strength greater than about 5 Mpa.

4. A method as in claim 1 wherein the part is skeletal.

5. A method as in claim 1 wherein the article of manufacture is an automotive vehicle.

6. A method as in claim 1 wherein the parts are substantially without supports and molded camera upon insertion into the cavity.

7. A method as in claim 1 wherein the expandable material is at least 90% by weight of the part upon insertion of the part into the cavity.

8. A method as in claim 1 wherein the part shaped of expandable material is a tubular structure with internal ribs, both the tubular structure and the ribs being formed of e expandable material and substantially maintaining its shape during expansion.

9. The method of claim 1, wherein the expandable material is not in liquid form prior to partial curing.

10. A method of reinforcing a structure of an automotive vehicle, the method comprising:
providing an initially solid pellet of expandable material including a first curing agent and having a self supporting characteristic during expansion thereof that is due to the presence of the first curing agent causing partial curing of the expandable material during processing of the pellet, and the inclusion of the following in the expandable material:
i) an acrylonitrile butadiene styrene copolymer,
ii) an elastomer and
iii) a fibrous filler;
injection molding the expandable material into a part;
inserting the part into a cavity that is at least partially defined by a structure of the automotive vehicle; and
activating the expandable material to cure due to the presence of a second curing agent, so that the expandable material expands to a volume that is less than 500% relative to its original unexpanded volume and adheres to walls of the structure and provide structural reinforcement to the structure wherein the part substantially maintains it's shape during expansion.

11. A method as in claim 10 wherein the expandable material is substantially tack-free to the touch.

12. A method as in claim 11 wherein the part, upon activation, forms a foam that exhibits a compressive strength greater than about 5 Mpa.

13. A method as in claim 12, wherein the part is skeletal and substantially maintains its skeletal shape during expansion.

14. A method as in claim 12 wherein the parts are substantially without supports and molded carriers upon insertion into the cavity.

15. A method as in claim 10 wherein the expandable material is at 90% by weight of the part upon insertion of the part into the cavity.

16. A method as in claim 10 wherein the part shaped of expandable material is a tubular structure with internal ribs, both the tubular structure and the ribs being formed of the expandable material.

17. A method of reinforcing a structure of an automotive vehicle, the method comprising:
providing an initially solid pellet of expandable material including a first curing agent and having a self supporting characteristic during expansion thereof that is due to the presence of the first curing agent causing partial curing of the expandable material or fast cure time of the expandable material and the inclusion of the following in the expandable material:
i) an acrylonitrile butadiene styrene copolymer:
ii) a butadiene-acrylonitrile elastomer and
iii) wollastonite;

injection molding the expandable material into a part having a tubular shape with internal ribs;

inserting the part into a cavity that is at least partially defined by a structure of the automotive vehicle; and activating the expandable material to cure due to the presence of a second curing agent, so that the expandable material expands to a volume that is less than 500% relative to its original unexpanded volume and adheres to walls of the structure and provides structural reinforcement to the structure.

18. A method as in claim 17 wherein:

i. the expandable material is substantially tack-free to the touch; and ii. the part, upon activation, forms a foam that exhibits a compressive strength greater than about 5 Mpa.

19. A method as in claim 18 wherein:

i. the parts are substantially without supports and molded carriers upon insertion into the cavity; and ii. the expandable material is at least 95% by eight of the part upon insertion of the part into the cavity.

20. The method, of claim 18, wherein the expandable material is not in liquid form prior to partial curing.

* * * * *

UNITED STATES PATENT AND TRADEMARK OFFICE
CERTIFICATE OF CORRECTION

PATENT NO. : 8,475,694 B2
APPLICATION NO. : 11/551035
DATED : July 2, 2013
INVENTOR(S) : Abraham Kassa et al.

It is certified that error appears in the above-identified patent and that said Letters Patent is hereby corrected as shown below:

In the Claims:
Column 20, Claim 6, Line 4, "camera" should be "carriers"
Column 20, Claim 8, Line 11, please delete "e" prior to the word "expandable"
Column 20, Claim 10, Line 36, "provide" should be "provides"
Column 21, Claim 19, Line 19, "eight" should be "weight"

Signed and Sealed this
Sixth Day of August, 2013

Teresa Stanek Rea
*Acting Director of the United States Patent and Trademark Office*